(12) United States Patent
Sato et al.

(10) Patent No.: US 12,306,337 B2
(45) Date of Patent: May 20, 2025

(54) AXIS-MISALIGNMENT ESTIMATION DEVICE

(71) Applicant: DENSO CORPORATION, Kariya (JP)

(72) Inventors: Koichi Sato, Kariya (JP); Hiroyuki Hotta, Kariya (JP); Hiroto Nakatani, Kariya (JP); Yuuji Katou, Kariya (JP)

(73) Assignee: DENSO CORPORATION, Kariya (JP)

( * ) Notice: Subject to any disclaimer, the term of this patent is extended or adjusted under 35 U.S.C. 154(b) by 375 days.

(21) Appl. No.: 18/055,170

(22) Filed: Nov. 14, 2022

(65) Prior Publication Data

US 2023/0082823 A1   Mar. 16, 2023

Related U.S. Application Data

(63) Continuation of application No. PCT/JP2021/018477, filed on May 14, 2021.

(30) Foreign Application Priority Data

May 15, 2020   (JP) .................. 2020-085973

(51) Int. Cl.
G01S 7/40 (2006.01)
G01S 13/58 (2006.01)
G01S 13/931 (2020.01)

(52) U.S. Cl.
CPC ............ G01S 7/4026 (2013.01); G01S 13/58 (2013.01); G01S 13/931 (2013.01)

(58) Field of Classification Search
None
See application file for complete search history.

(56) References Cited

U.S. PATENT DOCUMENTS

| | | | | |
|---|---|---|---|---|
| 5,341,147 A * | 8/1994 | Scott | .................... | H01Q 1/1257 |
| | | | | 342/359 |
| 5,977,906 A * | 11/1999 | Ameen | ................ | G01S 13/931 |
| | | | | 342/174 |
| 6,556,166 B1* | 4/2003 | Searcy | ................ | G01S 7/4026 |
| | | | | 343/703 |
| 6,714,156 B1* | 3/2004 | Ibrahim | ............... | G01S 7/4026 |
| | | | | 342/174 |
| 9,500,742 B2* | 11/2016 | Poiger | .................... | G01S 13/42 |
| | | (Continued) | | |

FOREIGN PATENT DOCUMENTS

| EP | 3104189 A1 * | 12/2016 | ........... G01S 7/4026 |
|---|---|---|---|
| WO | WO2007/015288 A1 * | 2/2007 | ........... G01S 7/4026 |

*Primary Examiner* — Bernarr E Gregory
(74) *Attorney, Agent, or Firm* — Maschoff Brennan

(57) ABSTRACT

An axis-misalignment estimation device estimates an axis-misalignment angle of a radar device mounted to a moving object. The axis-misalignment estimation device estimates the axis-misalignment angle using a plurality of different axis-misalignment angle estimation methods based on detection results of the radar device. The axis-misalignment estimation device determines whether a predefined employment condition is met, based on a plurality of axis-misalignment angle estimates estimated using respective ones of the plurality of axis-misalignment angle estimation methods. In response to determining that the employment condition is met, the axis-misalignment estimation device employs at least one of the plurality of axis-misalignment angle estimates.

6 Claims, 12 Drawing Sheets

(56) References Cited

U.S. PATENT DOCUMENTS

| | | | |
|---|---|---|---|
| 2016/0027176 A1* | 1/2016 | Zeng | G06V 20/588 |
| | | | 348/148 |
| 2016/0161597 A1* | 6/2016 | Treptow | G01S 13/931 |
| | | | 342/174 |
| 2016/0349356 A1* | 12/2016 | Takaki | G01S 13/931 |
| 2017/0262716 A1 | 9/2017 | Matsumoto | |
| 2017/0363718 A1* | 12/2017 | Ishimori | G01S 13/931 |

* cited by examiner

AXIS-MISALIGNMENT ESTIMATION DEVICE

CROSS-REFERENCE TO RELATED APPLICATION

This application is a continuation application of International Application No. PCT/JP2021/018477 filed May 14, 2021 which designated the U.S. and claims priority to Japanese Patent Application No. 2020-85973 filed with the Japan Patent Office on May 15, 2020, the contents of each of which are incorporated herein by reference.

BACKGROUND

Technical Field

The present disclosure relates to an axis-misalignment estimation device that estimates an axis-misalignment angle of a radar device.

Related Art

An object recognition device is known that determines an axis misalignment of a radar device based on results of object detection by an imaging device and the radar device.

DESCRIPTION OF SPECIFIC EMBODIMENTS

As a result of detailed research that was performed by the present inventors, an issue with the above known object recognition device, as disclosed in JP 2016-42288 A, was found that the imaging device needs to be separately installed to determine the axis misalignment of the radar device.

This disclosure is directed to simplification of the device configuration for axis-misalignment estimation.

One aspect of the present disclosure provides an axis-misalignment estimation device for estimating an axis-misalignment angle of a radar device mounted to a moving object, including an estimation unit, an employment determination unit, and an employment unit.

The estimation unit is configured to, based on detection results of the radar device, estimate the axis-misalignment angle using a plurality of different axis-misalignment angle estimation methods.

The employment determination unit is configured to determine whether a predefined employment condition is met, based on a plurality of axis-misalignment angle estimates estimated by the estimation unit using respective ones of the plurality of axis-misalignment angle estimation methods.

The employment unit is configured to, in response to the employment determination unit determining that the employment condition is met, employ at least one of the plurality of axis-misalignment angle estimates.

The axis-misalignment estimation device configured as above can estimate the axis-misalignment angle using two different axis-misalignment angle estimation methods, based on detection results of the radar device alone. Therefore, with the axis-misalignment estimation device estimating the axis misalignment angle using the plurality of axis-misalignment estimation methods, it is no longer necessary to use the detection results of devices other than the radar device, which can simplify the device configuration for axis-misalignment estimation.

Hereinafter, some embodiments of the disclosure will be described with reference to the drawings.

A radar device 1 of the present embodiment is mounted to a vehicle, such as a four-wheeled vehicle, and is operable to detect various objects located around the vehicle. Hereinafter, the vehicle carrying the radar device 1 is referred to as an own vehicle.

Figure 1A:
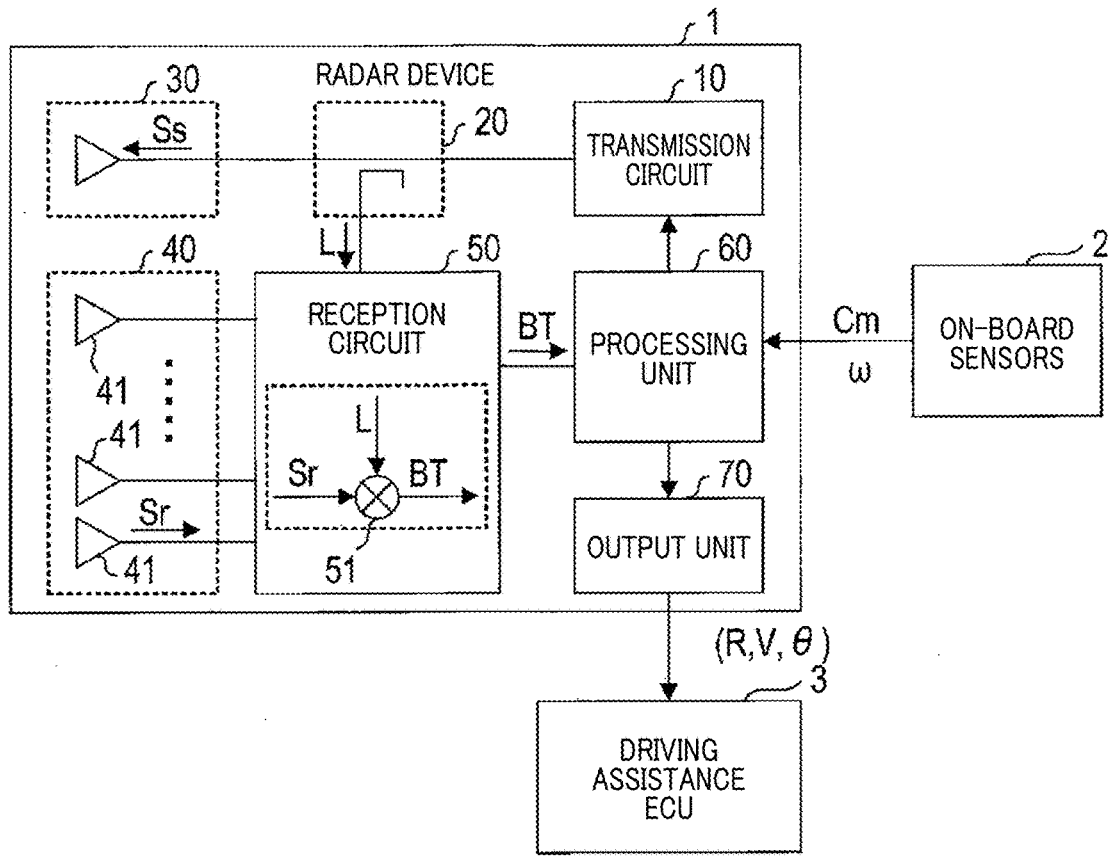
FIG. 1A is a block diagram illustrating a configuration of a radar device.

The radar device 1 transmits radar waves in the forward direction of the own vehicle and receives reflected radar waves to observe a distance R to an object that reflected the radar waves (hereinafter referred to as a "target"), a relative speed V of the target, and an azimuth θ of the target, and then outputs the observation value (R, V, θ) to a driving assistance ECU 3 as illustrated in FIG. 1A.

The driving assistance ECU 3 performs various processes to assist the driver in driving the vehicle based on the observation value (R, V, θ) of each target received from the radar device 1.

The radar device 1 includes a transmission circuit 10, a distributor 20, a transmitting antenna 30, a receiving antenna 40, a reception circuit 50, a processing unit 60, and an output unit 70.

Figure 2:
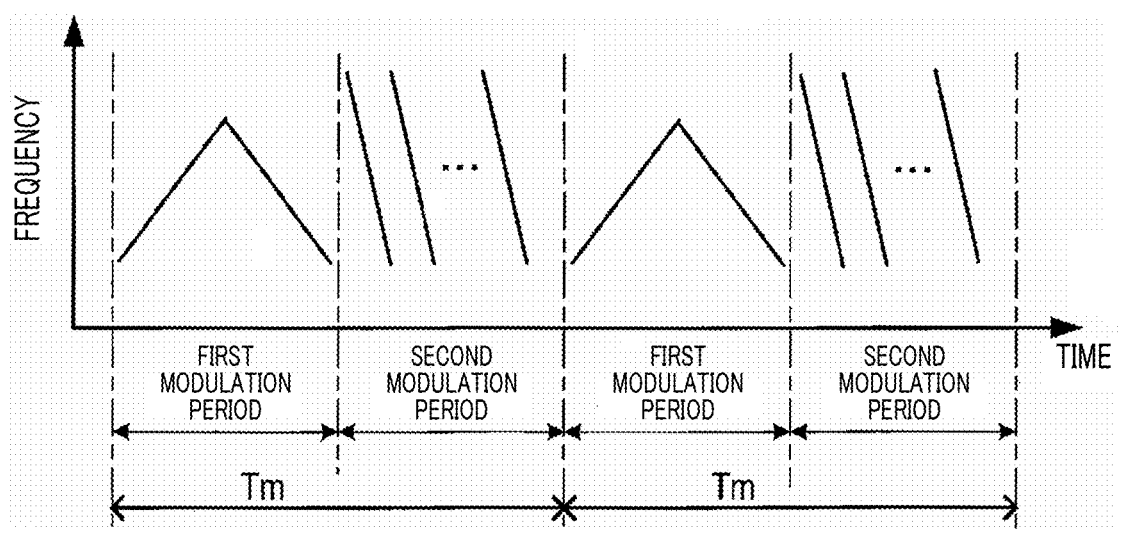
FIG. 2 is an illustration of a radar wave modulation scheme.

The transmission circuit 10 is operable to provide transmission signals Ss to the transmitting antenna 30. The transmission circuit 10 outputs high-frequency signals in the millimeter wave band to the distributor 20 located upstream of the transmitting antenna 30. Specifically, as illustrated in FIG. 2, the transmission circuit 10 generates high-frequency signals in alternating first and second modulation periods and outputs the generated high-frequency signals to the distributor 20. In each first modulation period, the transmission circuit 10 generates a frequency-modulated high-frequency signal formed of an up-chirp signal whose frequency increases and a down-chirp signal whose frequency decreases (hereinafter referred to as an "up-down chirp signal"). In each second modulation period, the transmission circuit 10 generates a frequency-modulated high-frequency signal formed of a plurality of chirp signals whose frequency increases (hereinafter referred to as a "chirp wave group").

That is, the radar device 1 operates as an up-down chirp radar that transmits and receives an up-down chirp signal during each first modulation period, and as a chirp wave group radar that transmits and receives a chirp wave group signal during each second modulation period.

Measurement by operation as the up-down chirp radar and measurement by operation as the chirp wave group radar are performed each time a measurement cycle Tm elapses.

In the second modulation period, the rate of change in frequency over time is set such that the frequency of a beat signal generated based on the reflected wave from a target at a predefined distance or greater is high enough that the Doppler frequency corresponding to the upper detection limit of the relative speed may be ignored. Furthermore, in the second modulation period, the rate of change in frequency over time is set such that the speed may be uniquely determined over the entire relative speed detection range.

As illustrated in FIG. 1A, the distributor 20 receives the high-frequency signal input from the transmission circuit 10, and distributes its power to a transmission signal Ss and a local signal L.

The transmitting antenna 30 emits a radar wave whose frequency changes according to the transmission signal Ss supplied from the distributor 20, in the forward direction of the own vehicle. The transmitting antenna 30 may be formed of a plurality of antennas.

The receiving antenna 40 is adapted to receive radar waves reflected from targets (hereinafter referred to as "reflected waves"). The receiving antenna 40 includes a plurality of antenna elements 41. The receiving antenna 40 is mounted such that the center axis of a detection region of the receiving antenna 40 coincides with the direction of travel of the own vehicle. A reception signal Sr of the reflected wave received by each antenna element 41 is input to the reception circuit 50.

The reception circuit 50 processes a reception signal Sr received from each antenna element 41 of the receiving antenna 40 and generates and outputs a beat signal BT for each antenna element 41. Specifically, the reception circuit 50 uses a mixer 51 to mix the reception signal Sr received from each antenna element 41 and the local signal L received from the distributor 20, and generates and outputs the beat signal BT for each antenna element 41.

The process of outputting the beat signal BT and prior thereto includes amplifying the reception signals Sr, removing unwanted signal components from the beat signals BT, and converting the beat signals BT into digital data. Thus, the reception circuit 50 converts the beat signal BT generated for each antenna element 41 into digital data and outputs it. The beat signal BT output for each antenna element 41 is input to the processing unit 60. In the following, the A/D conversion data of the beat signal BT acquired during the first modulation period is referred to as first modulation data, and the A/D conversion data of the beat signal BT acquired during the second modulation period is referred to as second modulation data.

The processing unit 60 is an electronic control unit configured around a microcomputer that includes a CPU, a ROM, and a RAM, as well as a a co-processor that performs the Fast Fourier transform (FFT) or the like. The various functions of the microcomputer are implemented by the CPU executing a program stored in a non-transitory tangible storage medium. In this example, the ROM corresponds to the non-transitory tangible storage medium storing the program. Execution of this program allows a method corresponding to the program to be performed. Some or all of the functions implemented by the CPU may be configured in hardware using one or more integrated circuits (ICs) or the like. The processing unit 60 may be constituted by single or plural microcomputers configured as above.

The processing unit 60 analyses the beat signal BT for each antenna element 41 to perform an object detection process of calculating observation values (R, V, θ) for each target that reflected the radar waves.

The processing unit 60 receives various detection signals from on-board sensors 2. The on-board sensors 2 are various sensors mounted to the vehicle to detect a state of the vehicle and other information. The on-board sensors 2 include a vehicle speed sensor which detects a vehicle speed and a yaw rate sensor which detects a yaw rate. The vehicle speed sensor outputs vehicle speed information indicating the detected vehicle speed Cm. The yaw rate sensor outputs yaw rate information indicating the detected yaw rate ω. The vehicle speed information and the yaw rate information are hereinafter also referred to as odometry information.

The output unit 70 outputs the observation values (R, V, θ) calculated by processing unit 60 to the driving assistance ECU 3.

The up-down chirp radar in the present embodiment is set for long-range measurement to measure targets located at long distances from the own vehicle. The chirp wave group radar in the present embodiment is set for short-range measurement to measure targets located at short distances from own vehicle.

In the present embodiment, specifically, the modulation bandwidth of the chirp wave group radar is set to be the same as or wider than the modulation bandwidth of the up-down chirp radar. This is because, with a modulation period fixed, the wider the modulation bandwidth, the greater the per-unit-time change in frequency of the beat signal and the less the change in distance corresponding to the unit frequency, which improves the distance resolution.

Using the sampling rate of the AD converter that converts the beat signals BT into digital data, the up-down chirp radar may be set for long-range measurement and the chirp wave group radar may be set for short-range measurement. The higher the sampling rate of the AD converter, the higher the frequency of the beat signal that can be detected, allowing targets at longer distances to be detected. That is, the sampling rate of the AD converter in the up-down chirp radar may be higher than the sampling rate of the AD converter in the chirp wave group radar.

Using the modulation period, the up-down chirp radar is set for long-range measurement and the chirp wave group radar is set for short-range measurement. The longer the modulation period, the lower the frequency of the beat signal can be detected, allowing targets at shorter distances to be detected. That is, the modulation period in the chirp wave group radar may be set longer than that in the up-down chirp radar.

A procedure of an object detection process to be performed by the processing unit 60 will now be described. The object detection process is repeatedly performed while the processing unit 60 is in operation.

Figure 3:
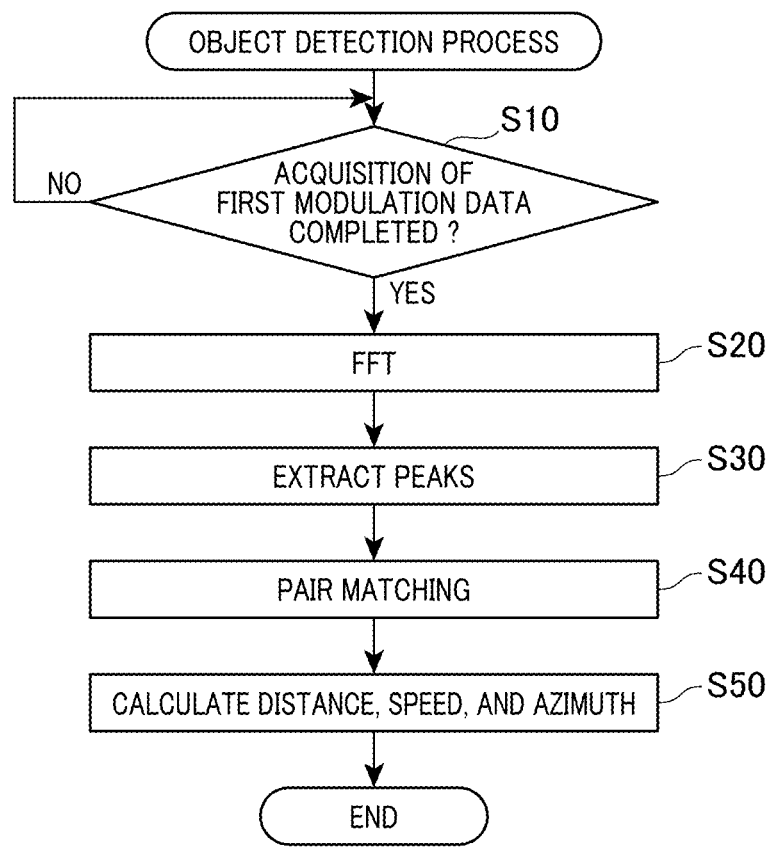
FIG. 3 is a flowchart of a target detection process for first modulation data.

Upon performing the target detection process as illustrated in FIG. 3, the processing unit 60, at S10, determines whether acquisition of the first modulation data (i.e., beat signals for the up-down chirp) has been completed. If acquisition of the first modulation data has not been yet completed, the processing unit 60 repeats the process at step S10 to wait for completion of acquisition of the first modulation data. Although only one pair of up and down chirps, indicated by the triangular shape, are generated as illustrated in FIG. 2, a plurality of pairs of up and down chirps may be generated.

Upon completion of acquisition of the first modulation data, the processing unit 60, at S20, performs a FFT (i.e., frequency analysis process) on the first modulation data for each antenna element 41 and for each of up- and down-chirps to generate a power spectrum. The power spectrum represents power of the reflected wave at each frequency.

Subsequently, at S30, the processing unit 60 calculates the average power spectrum that is the average of power spectra for each of the up- and down-chirps, and extracts from this average power spectrum a peak or peaks whose power is at or above a predefined peak detection threshold.

At S40, the processing unit 60 performs pair matching between the peaks for the up-chirp and the peaks for the down-chirp to combine the peaks based on the reflected waves from the same target. There are various specific methods for pair matching, which will not be described here since they are well known techniques.

At S50, the processing unit 60 calculates a distance, a relative speed, and an azimuth of each target, thereby generating observation values (R, V, θ) for each target. The observation values (R, V, θ) generated at S50 are hereinafter referred to as first observation values (R, V, θ).

Specifically, the processing unit 60 calculates the distance and the relative speed of each target based on the frequencies of the two peaks combined by pair-matching, using the well-known method of the up-down chirp radar. The processing unit 60 also calculates, for each target, the azimuth identified by the peak frequencies of the two peaks combined by pair-matching, based on phase difference information between signal components of the same peak frequency acquired from the plurality of antenna elements 41 constituting the receiving antenna 40.

Figure 4:
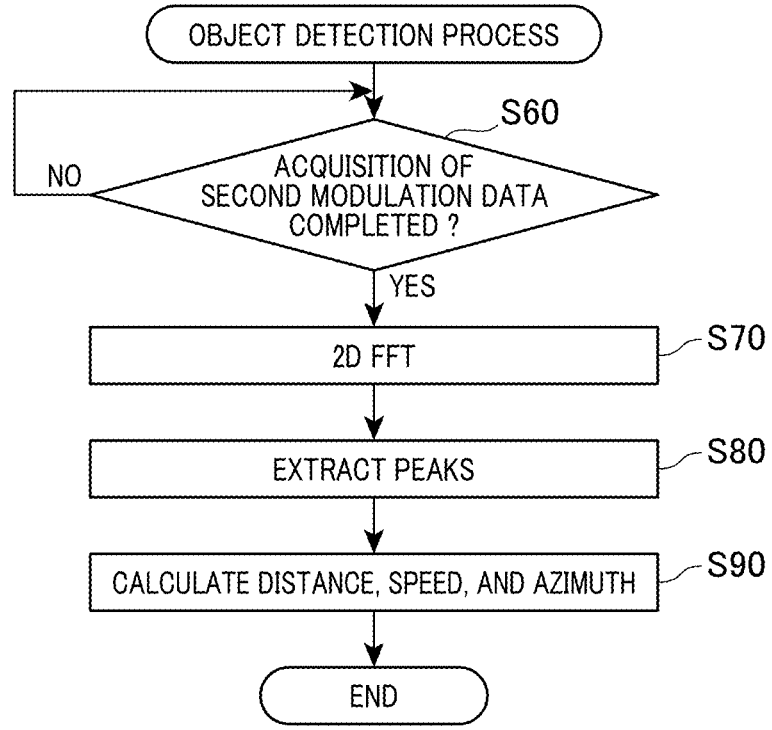
FIG. 4 is a flowchart of a target detection process for second modulation data.

In parallel with the object detection process on the first modulation data illustrated in FIG. 3, the processing unit 60 performs the object detection process on the second modulation data illustrated in FIG. 4. At S60, the processing unit 60 determines whether acquisition of the second modulation data has been completed. If acquisition of the second modulation data has not been completed, the processing unit 60 repeats the process at S60 to waiting for completion of acquisition of the second modulation data.

Upon completion of acquisition of the second modulation data, the processing unit 60 performs a two-dimensional (2D) FFT on the second modulation data at S70. Specifically, as illustrated in FIG. 4, the processing unit 60 performs the first FFT on each of the plurality of received chirp signals to generate a power spectrum. The processing unit 60 then performs the second FFT on data, at each frequency, of the plurality of FFT power spectra resulting from the first FFT. The frequencies of the beat signals detected by the reflected waves from the same target, for respective ones of the plurality of chirps, are equal to each other. The phase of the beat signal, in a case where there is a relative speed between the target and the own vehicle, varies gradually with each received chirp signal. That is, as a result of the second FFT, a power spectrum with the frequency component corresponding to the phase rotation speed regarded as the frequency (i.e., relative speed) is acquired for each frequency (i.e., distance) acquired as a result of the first FFT. Hereafter, this power spectrum is referred to as a two-dimensional power spectrum.

The processing unit 60, as illustrated in FIG. 4, extracts peaks from the two-dimensional power spectrum at S80. The processing unit 60, at S90, calculates a distance, a relative speed, and an azimuth of each target to generate observation values (R, V, θ) of the target, and then terminates the target detection process. The observation values (R, V, θ) generated at S90 are hereinafter referred to as second observation values (R, V, θ).

Specifically, the processing unit 60 calculates, for each of signals received at the plurality of receiving antennas, a distance and a speed from the frequency at which the two-dimensional power spectrum peaks. The processing unit 60 also calculates the azimuth by performing an azimuth detection process, such as beamforming, using amplitude and phase information of the peaks extracted from the signals received at the plurality of receiving antennas. The azimuth calculated here includes horizontal and vertical angles with respect to the center axis of the receiving antenna 40.

A procedure of an axis-misalignment correction process to be performed by the processing unit 60 will now be described. The axis-misalignment correction process is repeatedly performed every measurement period while the processing unit 60 is in operation.

Figure 5:
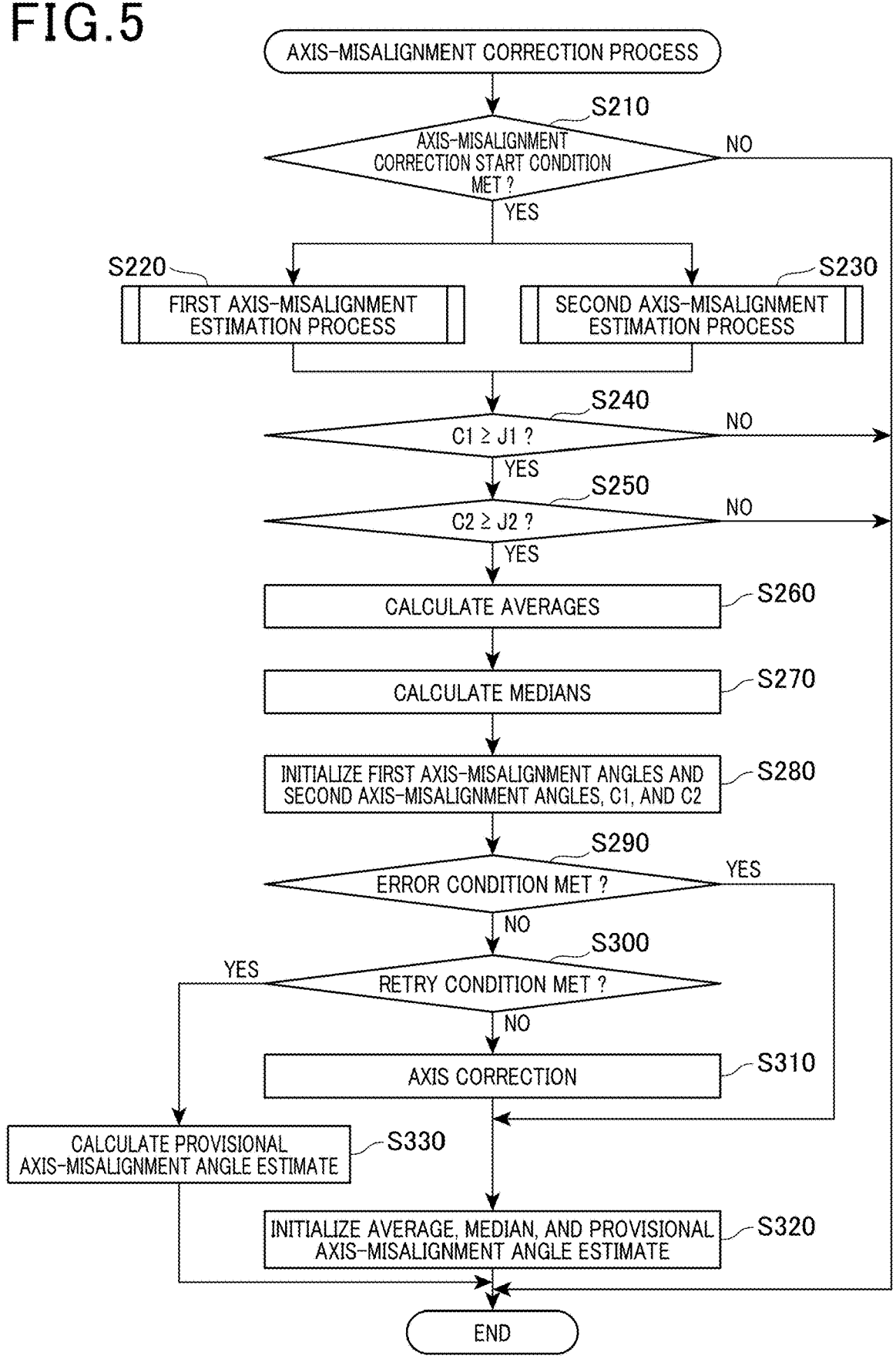
FIG. 5 is a flowchart of an axis-misalignment correction process.

Upon performing the axis-misalignment correction process as illustrated in FIG. 5, the processing unit 60, at S210, determines whether the predefined axis-misalignment correction start condition is met. In the present embodiment, the axis-misalignment correction start condition may be, for example, that information on the vehicle speed and the yaw rate detected by the on-board sensors 2 meets a predefined condition or conditions. If the axis-misalignment correction start condition is not met, the processing unit 60 does not perform the axis-misalignment correction process in the current cycle.

If the axis-misalignment correction start condition is met, the processing unit 60, at S220, performs a first axis-misalignment estimation process in parallel with a second axis-misalignment estimation process.

The first axis-misalignment estimation process will now be described.

Figure 6:
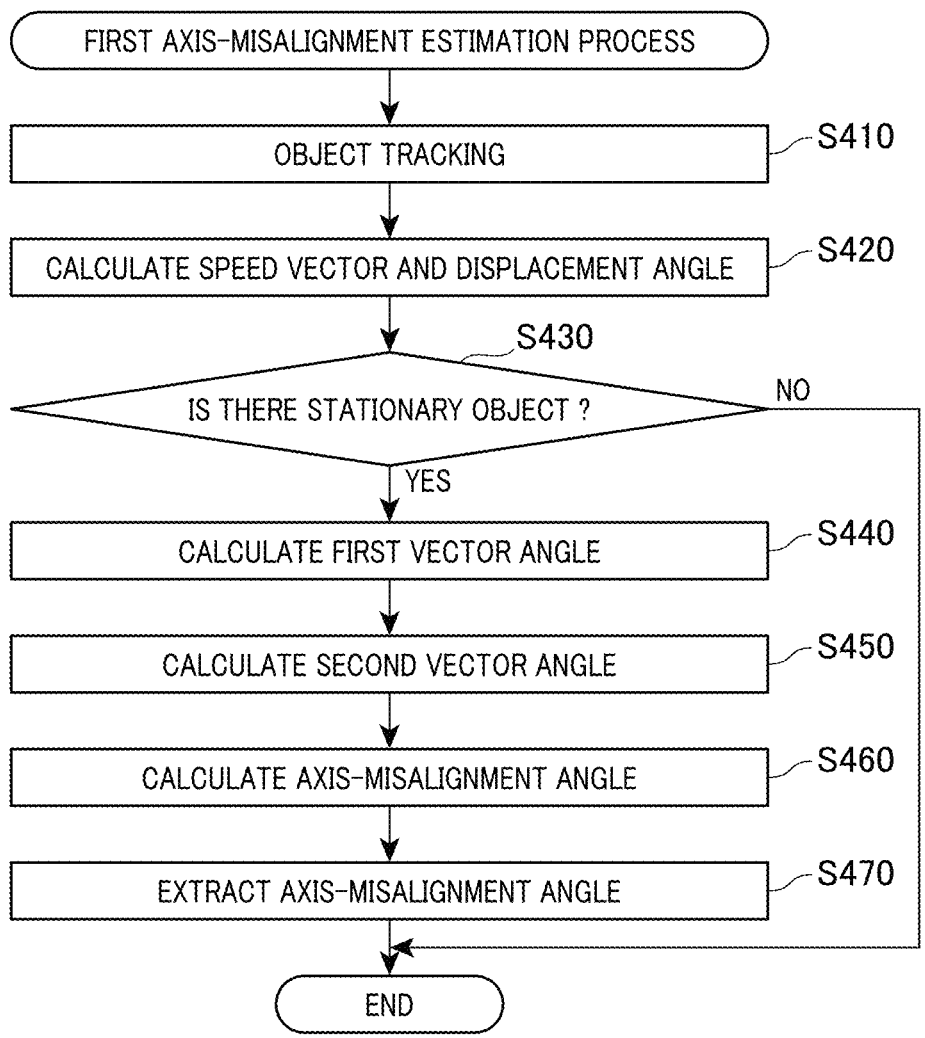
FIG. 6 is a flowchart of a first axis-misalignment estimation process.

Upon performing the first axis-misalignment estimation process as illustrated in FIG. 6, the processing unit 60, at S410, performs object tracking based on the first observation values generated at S50. The processing unit generates, for each of at least one stationary object ahead of the own vehicle, first measurement data that indicates the position (sx, sy) of the own vehicle and the relative speed vector vz to the own vehicle in the xy-coordinate plane forward of the own vehicle (see FIG. 7). The y-axis in the above xy-coordinate plane is the center axis of the receiving antenna 40. The x-axis in the above xy-coordinate plane is the axis orthogonal to the center axis of the receiving antenna 40.

Figure 7:
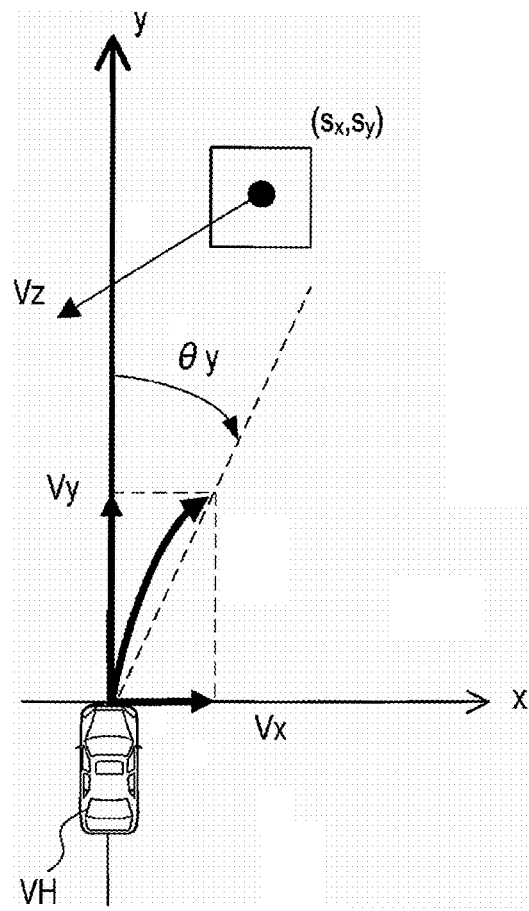
FIG. 7 is an illustration of speed vectors of an own vehicle and a stationary target.

Subsequently, at S420, the processing unit 60 calculates a speed vector (vx, vy) and a displacement angle θy of the own vehicle based on the odometry information acquired from the on-board sensors 2 (see FIG. 7).

At S430, the processing unit 60 determines whether a stationary object is included in the targets tracked at S410. Specifically, the processing unit 60 compares the speed vector vz of each target measured at S410 relative to the own vehicle with the speed vector (vx, vy) of the own vehicle calculated from the odometry information to determine whether the target is a stationary object.

If no stationary object is included, the processing unit 60 terminates the first axis-misalignment estimation process. If a stationary object is included, then at S440 the processing unit 60 calculates a first vector angle θb.

Figure 8:
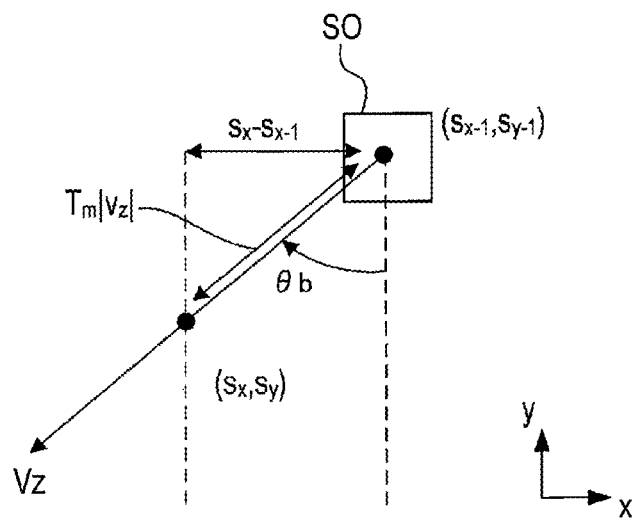
FIG. 8 is an illustration of a first vector angle.

As illustrated in FIG. 8, the first vector angle θb is an angle of a vector calculated from the position (sx, sy) of the stationary object in the xy-coordinate plane forward of the own vehicle and the position (sx-1, sy-1) detected the measurement period Tm ago, and the relative speed vector vz. The processing unit 60 calculates the first vector angle θb using Equation (1).

$$\theta b = \sin^{-1}\left(\frac{S_x - S_{x-1}}{T_m |v_z|}\right) \quad (1)$$

Furthermore, as illustrated in FIG. 6, at S450, the processing unit 60 calculates a second vector angle θe by performing ego-motion to predict a behaviour of the own vehicle based on the odometry information. Specifically, the processing unit 60 first calculates a predicted position (s'x, s'y) of the stationary object according to Equation (2), using the displacement angle θy, the speed vector (vx, vy) of the own vehicle, and the position (sx−1, sy−1) of the stationary object detected the measurement period Tm ago. The processing unit 60 then calculates the second vector angle θe using (sx−1, sy−1) and (s'x, s'y).

Figure 9:
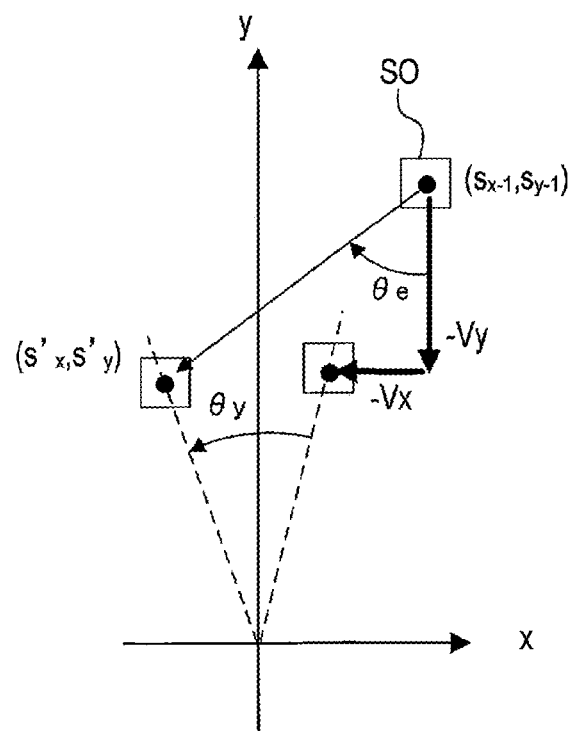
FIG. 9 is an illustration of a second vector angle.

As illustrated in FIG. 9, the second vector angle θe is an angle of the vector with the position (sx−1, sy−1) of the stationary object detected the measurement period Tm ago as the start point and the predicted position (s'x, s'y) of the vehicle as the end point. Hence, the processing unit 60 calculates the second vector angle θe according to Equation (3).

$$\begin{bmatrix} S'_x \\ S'_y \end{bmatrix} = \begin{bmatrix} \cos\theta_y & -\sin\theta_y \\ \sin\theta_y & \cos\theta_y \end{bmatrix} \begin{bmatrix} S_{x-1} + (-v_x) \\ S_{y-1} + (-v_y) \end{bmatrix} \quad (2)$$

$$\theta e = \tan^{-1}\left(\frac{S'_x - S_{x-1}}{S'_y - S_{y-1}}\right) \quad (3)$$

As illustrated in FIG. 6, the processing unit 60, at S460, calculates an axis-misalignment angle (or off-axis angle) θgap according to Equation (4), and proceeds to S470. The axis-misalignment angle θgap is calculated based on the measurement results for all of the stationary objects acquired at S410. That is, if the measurement results for m stationary objects are acquired at S410, m axis-misalignment angles θgap are calculated via the process steps S440 to S460.

$$\theta_{gap} = \theta b - \theta e \quad (4)$$

Upon proceeding to S470, the processing unit 60 performs an axis-misalignment angle extraction process. Specifically, the processing unit 60 extracts, from the m calculated axis-misalignment angles θgap, axis-misalignment angles θgap that fall within a predefined angle range. The M axis-misalignment angles θ1 gap extracted in this manner are stored in the RAM of the processing unit 60.

Furthermore, as expressed in Equation (5), the processing unit 60 stores, in an axis-misalignment angle detection count C1 set in the RAM of the processing unit 60, the number of axis-misalignment angles M extracted plus a value stored in the axis-misalignment angle detection count C1.

$$C1 = C1 + M \quad (5)$$

As illustrated in FIG. 5, in parallel with the first axis-misalignment estimation process, the processing unit 60 performs a second axis-misalignment estimation process at S230.

The second axis-misalignment estimation process will now be described.

Figure 10:
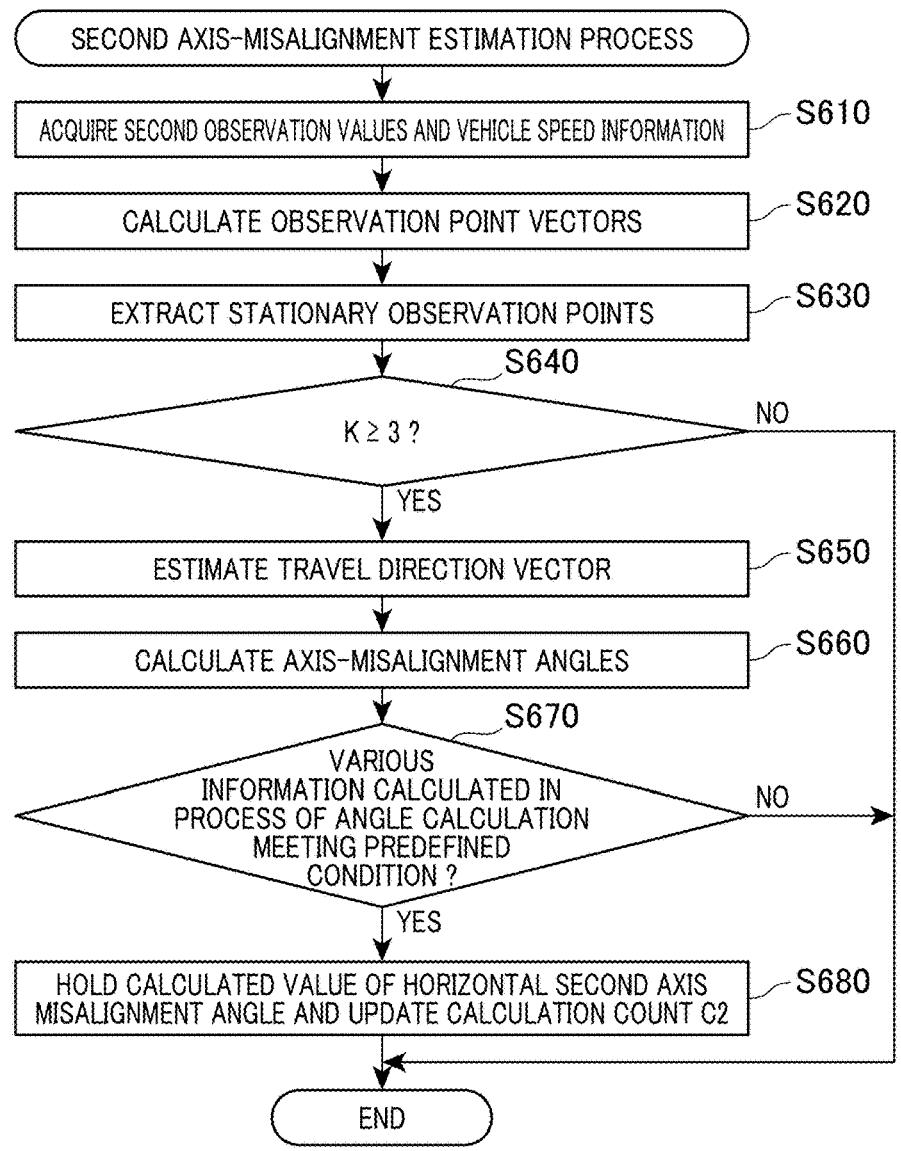
FIG. 10 is a flowchart of a second axis-misalignment estimation process.

Upon performing the second axis-misalignment estimation process as illustrated in FIG. 10, the processing unit 60, at S610, acquires the latest second observation values (R, V, θ) detected by the chirp wave group method, and then acquires vehicle speed information from the on-board sensors 2. Hereafter, a point identified from the observation values is referred to as an observation point.

Figure 11:
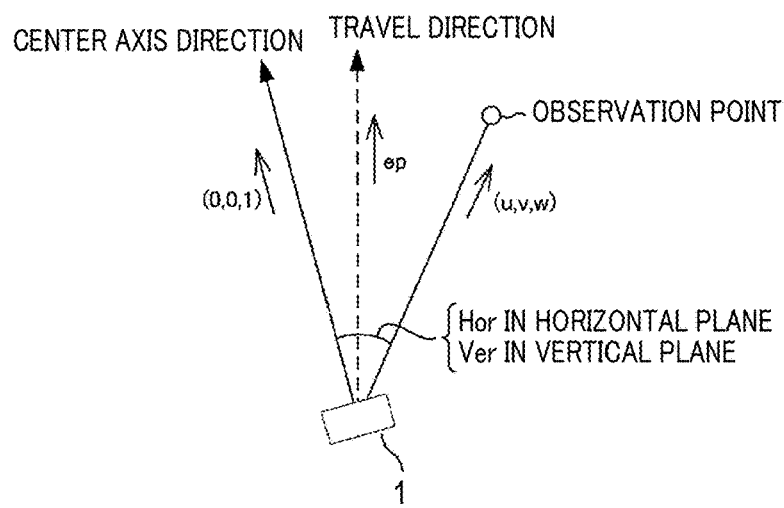
FIG. 11 is an illustration of a relationship between a direction of the center axis of the radar device, a travel direction of the vehicle, and a direction in which an observation point is located.

At S620, the processing unit 60 performs a coordinate transformation for each of observation points based on the second observation values acquired at S610. Specifically, as illustrated in FIG. 11, the processing unit 60 uses Equations (6), (7), and (8) to acquire the three-dimensional coordinates (u, v, w). Hor in Equation (6) is a horizontal angle included in the second observation values. Ver in Equation (7) is a vertical angle included in the second observation values.

$$u = \sin(\text{Hor}) \quad (6)$$

$$v = \sin(\text{Ver}) \quad (7)$$

$$w = \sqrt{1 - u^2 - v^2} \quad (8)$$

The three-dimensional coordinates (u, v, w) represent a horizontal distance u on the plane perpendicular to the center axis, a vertical distance v on the plane perpendicular to the center axis, and a distance w in the direction of the center axis, with the distance to the observation point set as 1. The three-dimensional coordinates (u, v, w) represent a unit vector that indicates the direction in which the observation point exists as viewed from the radar device 1 (hereinafter referred to as an "observation point vector"). In particular, the distance w represents the magnitude of the relative speed in the direction indicated by the observation point vector, actually detected by the radar device 1, with the relative speed in the center axis direction when the own vehicle and the observation point are moving in the same direction set as 1. The distance w is also referred to as a Doppler attenuation rate.

Furthermore, at S630, the processing unit 60 extracts observation points originating from stationary objects (hereinafter referred to as "stationary observation points") from the observation points identified by the second observation values acquired at S610. Specifically, using the vehicle speed Cm indicated by the vehicle speed information acquired at S610, the processing unit 60 extracts, as stationary observation points, observation points that satisfy Inequality (9) with the relative speed included in the second observation values denoted by q and a predefined threshold value denoted by $\varepsilon$. That is, the observation point such that the absolute value of a value that results from adding a ratio of the relative speed q to the vehicle speed Cm and the Doppler attenuation rate w is less than the threshold value $\varepsilon$ is a stationary observation point. It is assumed that the number of stationary observation points extracted is K.

$$|q/Cm+w|<\varepsilon \quad (9)$$

That is, in a case where the direction indicated by the observation point vector (u, v, w) of the stationary observation point coincides with the center axis direction (0, 0, 1) (i.e., w=1), the vehicle speed Cm and the relative speed q of the observation point have the same magnitude, and the direction of the relative speed q is opposite from the vehicle speed Cm. Therefore, q/Cm=−1. In a case where the direction indicated by the observation point vector of the stationary observation point does not coincide with the direction of the center axis (i.e., w≠1), the relative speed q decreases at a rate corresponding to the Doppler attenuation rate w. Therefore, q/Cm=−w.

That is, in any case, the observation point for which the left side of Inequality (9) is 0 is considered to be a stationary observation point. However, the vehicle speed Cm acquired from the on-board sensors 2 does not necessarily coincide with the actual vehicle speed due to wheel slip or the like. In a case where the direction of the center axis and the direction of travel of the own vehicle are misaligned, the relative velocity q detected by the radar device 1 may also vary according to the misalignment. Thus, even if the observation point is a stationary observation point, the left side of Inequality (9) is not necessarily zero. Thus, the threshold value $\varepsilon$ is set appropriately in consideration of these effects.

At S640, the processing unit 60 determines whether the number of extracted stationary observation points, K, is greater than or equal to 3. If the number of extracted stationary observation points, K, is less than 3, the processing unit 60 terminates the second axis-misalignment estimation process.

If the number of extracted stationary observation points, K, is greater than or equal to 3, then at S650 the processing unit 60 estimates the unit vector indicating the actual direction of travel of the vehicle (hereinafter referred to as a travel direction vector), ep, and the actual speed of the own vehicle, Cp, using Equation (10). The speed of the own vehicle Cp is a scalar. Q in Equation (10) is a column vector of relative speeds q of K stationary observation points, as expressed by Equation (11). E in Equation (10) is a matrix of the observation point vectors, which are row vectors, of the K stationary observation points ordered in the column direction, as expressed by Equation (12). The travel direction vector ep is a column vector formed of a horizontal component up, a vertical component vp, and a beam direction component wp, as expressed by Equation (13). Here, |ep|=1.

$$Q = E \cdot Cp \cdot ep \quad (10)$$

$$Q = \begin{bmatrix} q_1 \\ q_2 \\ \vdots \\ q_K \end{bmatrix} \quad (11)$$

$$E = \begin{bmatrix} u_1 & v_1 & w_1 \\ u_2 & v_2 & w_2 \\ \vdots & \vdots & \vdots \\ u_K & v_K & w_K \end{bmatrix} \quad (12)$$

$$ep = \begin{bmatrix} up \\ vp \\ wp \end{bmatrix} \quad (13)$$

That is, Equation (10) represents a set of K simultaneous equations with a component of the speed of the own vehicle Cp and components of the travel direction vector ep as unknown parameters. Solving these simultaneous equations allows the speed of the own vehicle Cp and the travel direction vector ep to be acquired. The travel direction vector ep are formed of three components, where any one component may be derived from the other two components. That is, the total number of unknown parameters to be actually determined is three, including the own vehicle speed Cp. Therefore, three or more stationary observation points are needed to solve Equation (10). The specific solving method for the simultaneous equations is well known and will not be described here. As an example, the solving method may include, but is not limited to, the method of least squares.

Figure 12:
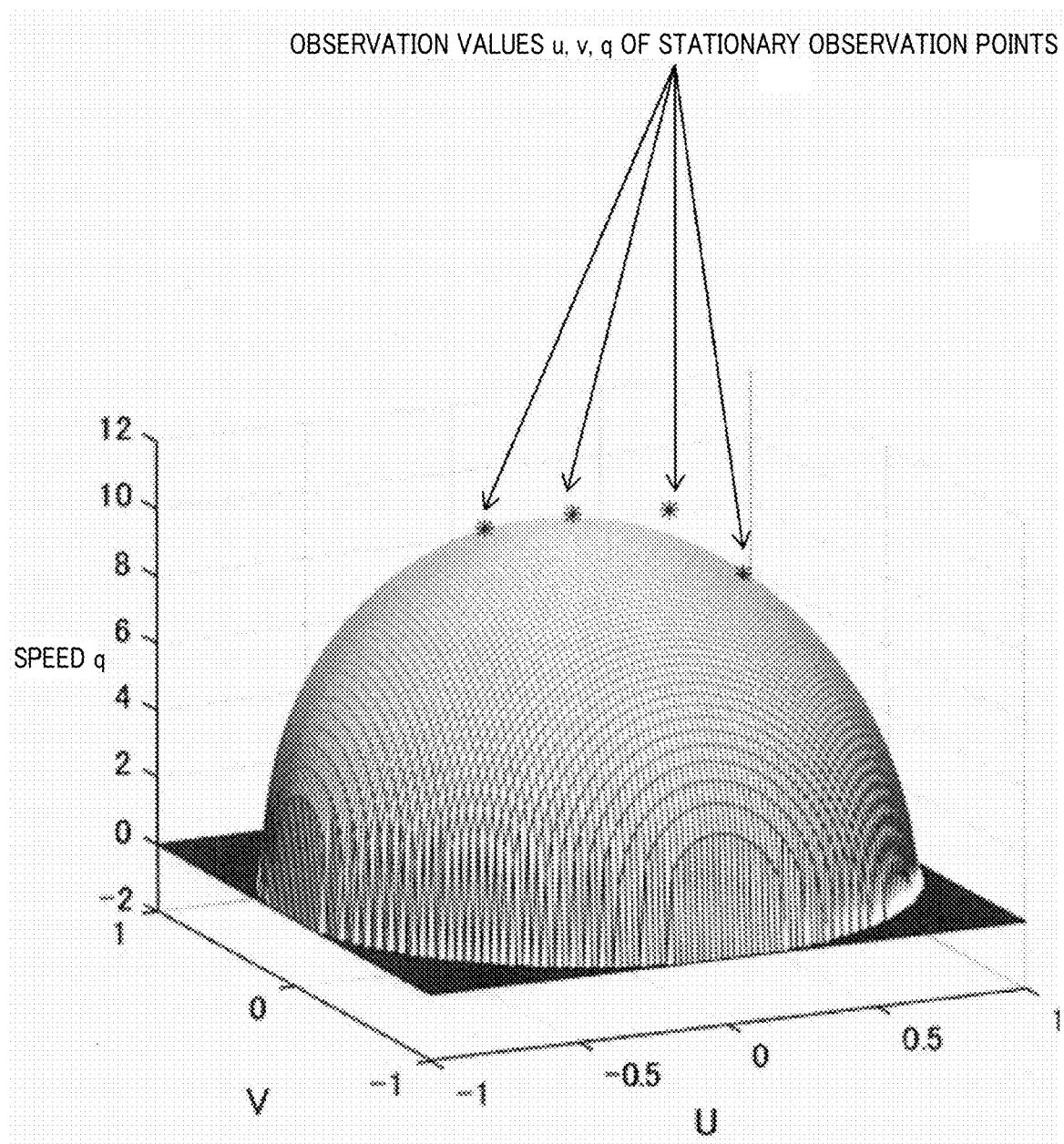
FIG. 12 is a graph illustrating a region in which observation point vectors exist.

FIG. 12 is a graph illustrating a region (i.e., on the hemisphere in FIG. 12) in which the observation point vector (u, v, w) exists. The scale on the w-axis is transformed so as to represent the relative speed q. Specifically, the scale on the w-axis is transformed such that the vehicle speed Cm corresponds to w=1. When u, v, and q of the stationary observation point are plotted in the coordinate system illustrated in FIG. 12, in a situation where the direction of the center axis and the direction of travel coincide, the stationary observation points are plotted on the hemisphere. Solving the above simultaneous equations corresponds to finding the travel direction vector and the vehicle speed such that all the stationary observation points are plotted on the hemisphere.

Subsequently, at S660, using Equations (14) and (15), the processing unit 60 calculates, based on the horizontal component up and the vertical component vp of the travel direction vector ep estimated at S650, a horizontal, second axis-misalignment angle θ2hgap of the direction of the center axis of the radar device 1 relative to the direction of travel of the own vehicle (hereinafter referred to as a horizontal second axis-misalignment angle θ2hgap) and a vertical, second axis-misalignment angle θ2vgap of the direction of the center axis of the radar device 1 relative to the direction of travel of the own vehicle (hereinafter referred to as a vertical second axis-misalignment angle θ2vgap).

At S670, the processing unit 60 determines whether the second axis-misalignment angles θ2hgap and θ2vgap or various information calculated in the process of calculating the second axis-misalignment angles meet a predefined condition, such as a condition that θ2hgap is within a predefined second horizontal extraction angle range.

If at S670 the processing unit 60 determines that the predefined condition is met, the processing unit 60 may, at S680, hold the value of the horizontal second axis-misalignment angle θ2hgap in the RAM of the processing unit 60 and store, in the second calculation count C2, the value that results from incrementing the value stored in the second calculation count C2 by one, and thereafter terminates the second axis-misalignment estimation process.

$$\theta 2h_{gap} = \arcsin(up) \quad (14)$$

$$\theta 2v_{gap} = \arcsin(vp) \quad (15)$$

Upon completion of the first axis-misalignment estimation process at S220 and the second axis-misalignment estimation process at S230, the processing unit 60, at S240, determines whether the value stored in the first calculation count C1 is greater than or equal to a predefined first correction determination count J1, as illustrated in FIG. 5. If the value stored in the first calculation count C1 is less than the first correction determination count J1, the processing unit 60 terminates the axis-misalignment correction process in the current cycle.

If the value stored in the first calculation count C1 is greater than or equal to the first correction determination count J1, then at S250 the processing unit 60 determines whether the value stored in the second calculation count C2 is greater than or equal to a predefined second correction determination count J2. If the value stored in the second calculation count C2 is less than the second correction determination count J2, the processing unit 60 terminates the axis-misalignment correction process in the current cycle. If the value stored in the second calculation count C2 is greater than or equal to the second correction determination count J2, then at S260 the processing unit 60 calculates the average of the first axis-misalignment angles θ1 gap and the average of the horizontal second axis-misalignment angles θ2hgap.

The average of C1 first axis-misalignment angles θ1gap, where C1 is the value of the first calculation count, is referred to as a first axis-misalignment angle average θ1_ave.

The average of C2 second horizontal axis-misalignment angles θ1gap, where C2 is the value of the second calculation count, is referred to as a horizontal second axis-misalignment angle average θ2h_ave.

Subsequently, at S270, the processing unit 60 calculates the median of the first axis-misalignment angles θ1gap. The median is a middle value when a plurality of pieces of data are ordered from smallest to greatest. The median of the first axis-misalignment angles θ1gap is referred to as a first axis-misalignment angle median θ1_med.

Furthermore, at S280, the processing unit 60 initializes the RAM area of the processing unit 60 holding the C1 first axis-misalignment angles θ1gap and C2 horizontal second axis-misalignment angles θ2hgap, where C1 is the value of first calculation count and C2 is the value of second calculation count, and initializes the values stored in the first calculation count C1 and the second calculation count C2 to 0.

At S290, the processing unit 60 determines whether a predefined error condition is met. The error condition in the present embodiment is a condition for determining whether the axis misalignment is not extremely large or whether the result of axis-misalignment estimation is not obviously wrong. The error condition may be a condition that at least one of a first error determination condition and a second error determination condition described later is met.

The first error determination condition is that the absolute value of the first axis-misalignment angle average θ1_ave is greater than or equal to a predefined first error determination angle.

The second error determination condition is that the absolute value of a difference between the first axis-misalignment angle average θ1_ave and the horizontal second axis-misalignment angle average θ2h_ave is greater than or equal to a predefined second error determination angle.

If the error condition is met, the processing unit 60 proceeds to S320. At S320, the processing unit 60 initializes the average calculated at S260, the median calculated at S270, and a provisional axis-misalignment angle estimate θ'_est described later, and then terminates the axis-misalignment correction process in the current cycle. If the error condition is not met, then at S300 the processing unit 60 determines whether a predefined retry condition is met. The retry condition in the present embodiment is a condition for determining whether the error in each of the first axis-misalignment angle average θ1_ave and the horizontal second axis-misalignment angle average θ2h_ave with respect to the true value of axis misalignment is within an allowable range, that is, a condition that at least one of a first retry determination condition, a second retry determination condition, and a third retry determination condition described later is met.

The first retry determination condition is that the absolute value of the first axis-misalignment angle average θ1_ave is greater than or equal to a predefined first retry determination angle. In the present embodiment, the first retry determination angle is set to a value less than the first error determination angle.

The second retry determination condition is that the absolute value of the horizontal second axis-misalignment angle average θ2h_ave is greater than or equal to a predefined second retry determination angle.

The third retry determination condition is that the absolute value of a difference between the first axis-misalignment angle average θ1_ave and the first axis-misalignment angle median θ1_med is greater than or equal to the predefined third retry determination angle.

Figure 13:
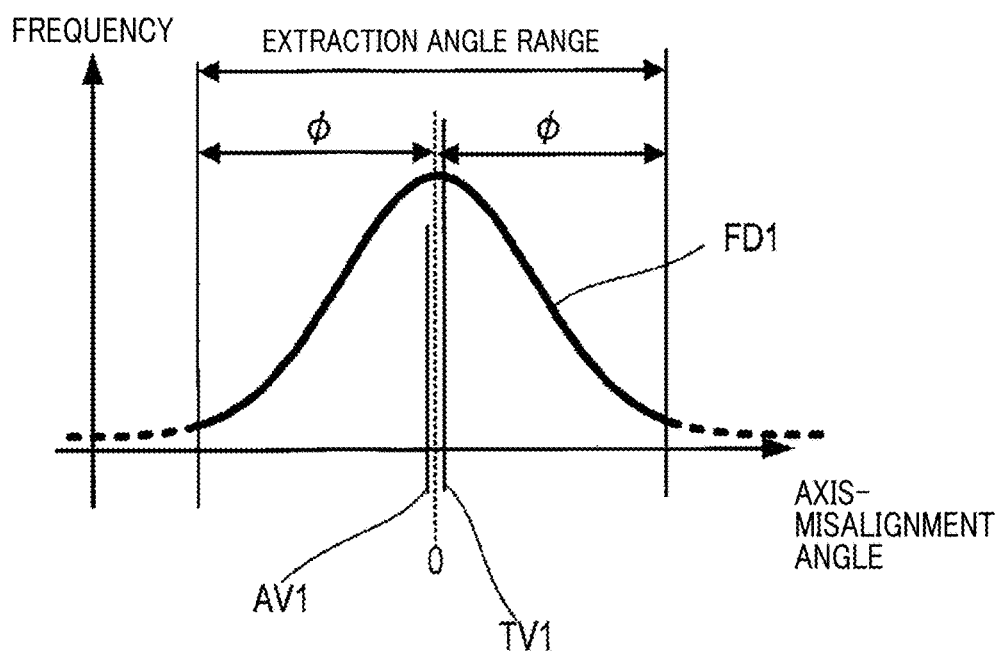
FIG. 13 is an illustration of a frequency distribution of axis-misalignment angles in a case where the average and the true value are approximately equal.

As illustrated in FIG. 13, when the true value of axis-misalignment angle, TV1, is small (i.e., when the amount of axis-misalignment is small), the frequency distribution FD1 of the extracted axis-misalignment angles within an extraction angle range set by −φ[°] to +φ[°] is symmetrical, and the average of the axis-misalignment angles, AV1, is approximately equal to the true value of the axis-misalignment angle, TV1.

Figure 14:
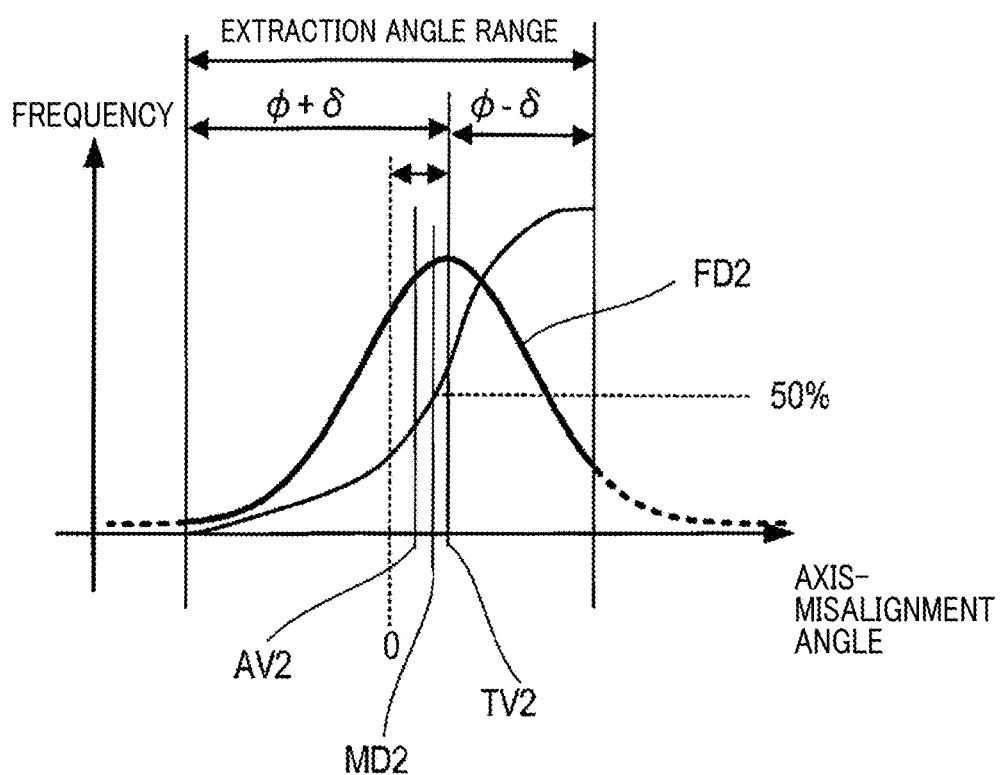
FIG. 14 is an illustration of a frequency distribution of axis-misalignment angles in a case where a difference between the average and the true value is large.

As illustrated in FIG. 14, when the true value of axis-misalignment angle, TV2, is large (i.e., when the amount of axis-misalignment is large), the frequency distribution FD2 of the extracted axis-misalignment angles within the extraction angle range set by −φ[°] to +φ[°] becomes asymmetrical, and the difference between the average of the axis-misalignment angles, AV2, and the median of a plurality of axis-misalignment angles, MD2, becomes large.

Figure 15:
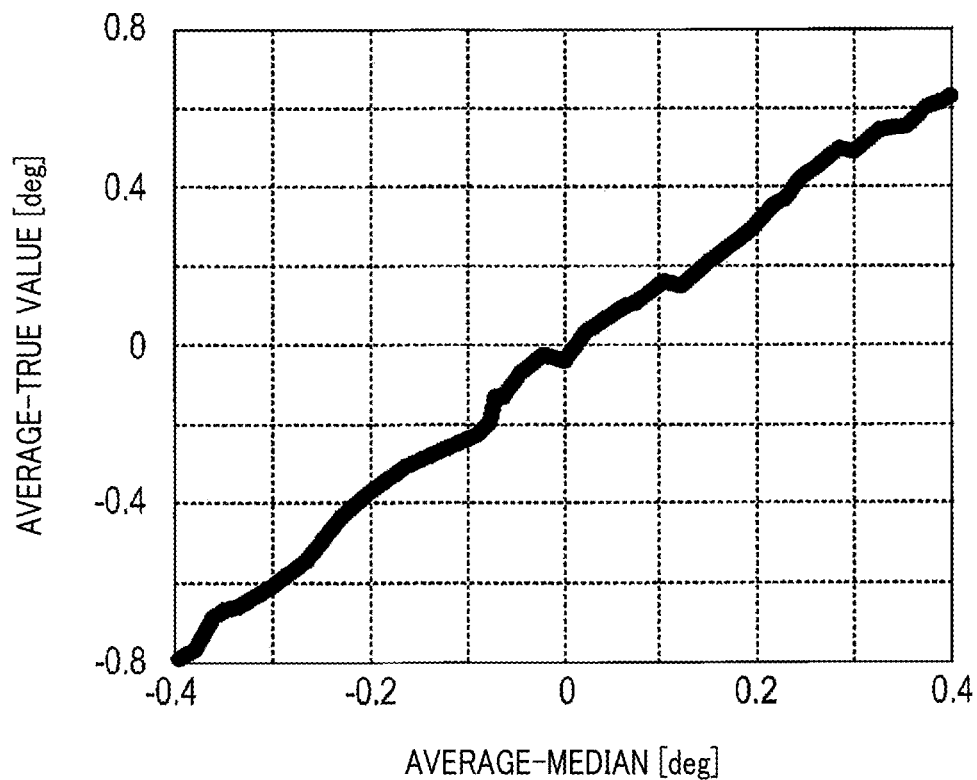
FIG. 15 is a graph illustrating a relationship between a value resulting from subtracting the median from the average and a value resulting from subtracting the true value from the average.

As illustrated in FIG. 15, the value resulting from subtracting the median of the axis-misalignment angles from the average of the axis-misalignment angles is positively correlated with the value resulting from subtracting the true value of the axis-misalignment angle from the average of the axis-misalignment angles.

As illustrated in FIG. 15, the third retry determination condition is set based on the fact that the larger the difference between the average of the axis-misalignment angles and the median of the axis-misalignment angles, the larger the difference between the average of the axis-misalignment angles and the true value of the axis-misalignment angle.

Figure 16:
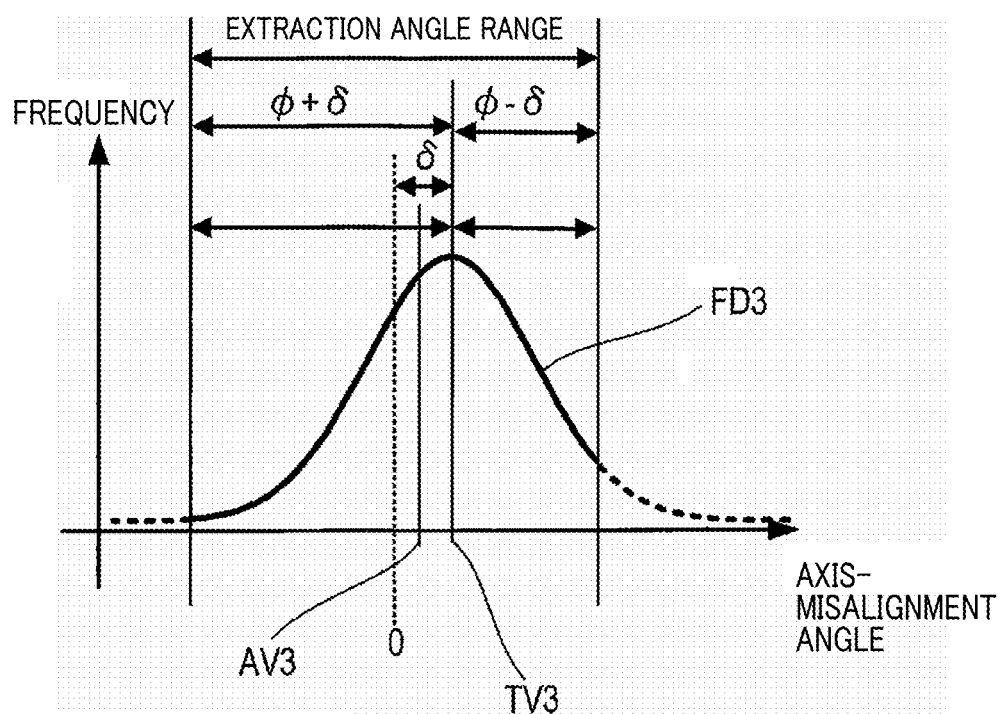
FIG. 16 is an illustration of a frequency distribution of axis-misalignment angles in the case of large amounts of axis-misalignment.

As illustrated in FIG. 16, when the true value of the axis-misalignment angle, TV3, is δ (i.e., when the amount of axis-misalignment is large), the frequency distribution FD3 of the extracted axis-misalignment angles within the extraction angle range set by −φ[°] to +φ[°] becomes asymmetrical, and the difference between the average of a plurality of axis-misalignment angles, AV3, and the true value of the axis-misalignment angle, TV3, become large.

Figure 17:
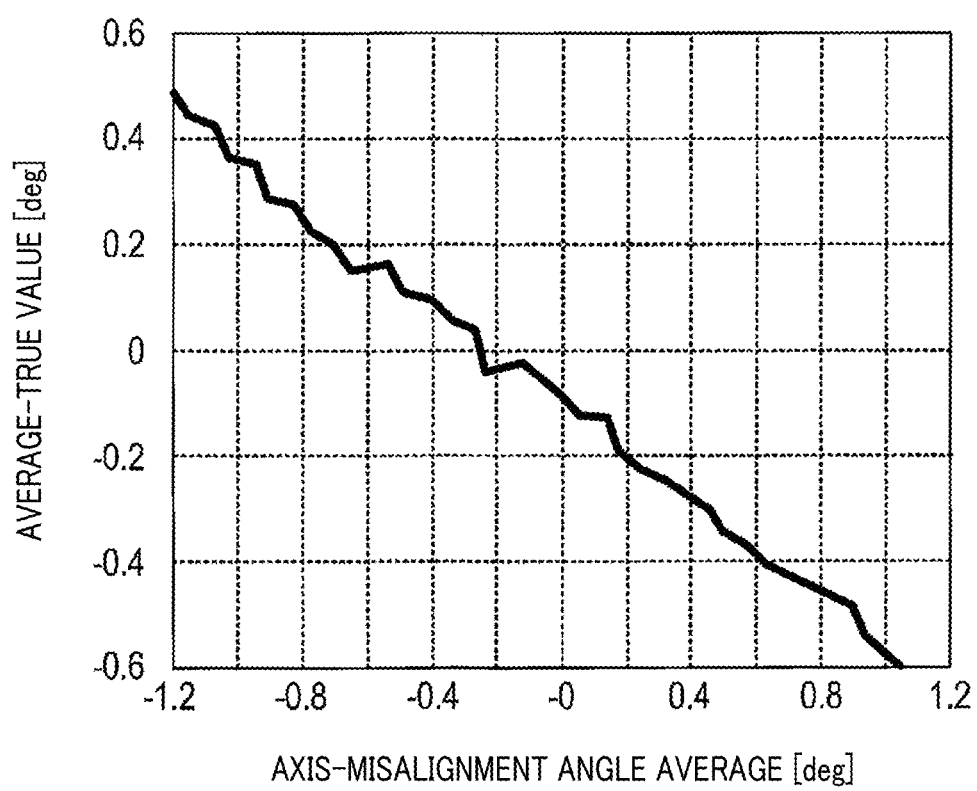
FIG. 17 is a graph illustrating a relationship between the average and a value resulting from subtracting the true value from the average.

As illustrated in FIG. 17, the average of the axis-misalignment angles is negatively correlated with the value resulting from subtracting the true value of the axis-misalignment angle from the average of the axis-misalignment angles.

As illustrated in FIG. 17, the first and second retry determination conditions are set based on the fact that as the average of the axis-misalignment angles increases, the difference between the average of the axis-misalignment angles and the true value of the axis-misalignment angle increases.

If the retry condition is met, the processing unit 60, as illustrated in FIG. 5, proceeds to S330. At S330, the processing unit 60 holds in the RAM the first axis-misalignment angle average $\theta1\_ave$ as a provisional axis-misalignment angle estimate $\theta'\_est$, sets up the processes at S50 and S90 in such a way that the center axis of the receiving antenna 40 is assumed to be misaligned by the axis-misalignment angle estimate $\theta'\_est$ in the generation process of the first observation values at S50 and the generation process of the second observation values at S90. Thereafter, if the retry condition is met again, the provisional axis-misalignment angle $\theta'\_est$ is calculated by adding the first axis-misalignment angle average $\theta1\_ave$ to the provisional axis-misalignment angle estimate $\theta'\_est$.

If the retry condition is not met, then at S310 the processing unit 60 performs an axis correction process at S310. Specifically, the processing unit 60 stores in the RAM the first axis-misalignment angle average $\theta1\_ave$ as an axis-misalignment angle estimate $\theta\_est$, set up the processes at S50 and S90 in such a way that the center axis of the receiving antenna 40 is assumed to be misaligned by the axis-misalignment angle estimate $\theta\_est$ in the generation process of the first observation values at S50 and the generation process of the second observation values at S90. Here, in a case where the provisional axis-misalignment angle estimate $\theta'\_est$ is set at S330, the processing unit 60 holds in the RAM the value resulting from adding the provisional axis-misalignment angle estimate $\theta'\_est$ to the first axis-misalignment angle average $\theta1\_ave$ as an axis-misalignment angle estimate $\theta\_est$.

Upon completion of the axis correction process at S310, the processing unit 60, at S320, initializes the average calculated at S260, the median calculated at S270, and the $\theta'\_est$ calculated at S330, and terminates the axis-misalignment correction process.

The processing unit 60 thus configured estimates axis-misalignment angles based on the results of detection by the radar device 1, using two different axis-misalignment estimation methods.

One of the two axis-misalignment angle estimation methods is referred to as a first estimation method, and the other of the two axis-misalignment angle estimation methods is referred to as a second estimation method.

The first estimation method is a method based on the first axis-misalignment estimation process, that is, a method of estimating the axis-misalignment angle using variations in position of a stationary object with time and its relative speed detected by the radar device 1, and the predicted position of the stationary object calculated by ego-motion of the own vehicle.

The second estimation method is a method based on the second axis-misalignment estimation process, that is, a method of estimating the axis-misalignment angle using the position and the relative speed of the stationary object detected by the radar device 1.

The processing unit 60 determines whether the predefined employment condition is met, based on two axis-misalignment angles respectively estimated using the two axis-misalignment angle estimation methods. The employment condition is that none of the error condition and the retry condition are met.

If determining that the employment condition is met, the processing unit 60 employs the axis-misalignment angle estimated using the first estimation method.

This allows the processing unit 60 to estimate the axis-misalignment angle using two different axis-misalignment angle estimation methods, based on detection results of the radar device 1 alone. Therefore, with the processing unit 60 estimating the axis-misalignment angle using the two axis-misalignment estimation methods, it is no longer necessary to use the detection results of devices other than the radar device 1, which can simplify the device configuration for axis-misalignment estimation.

If the processing unit 60 determines that the employment condition is not met due to the error determination condition being met, the processing unit 60 does not employ the axis-misalignment angle estimate and terminates the axis-misalignment angle estimation process. If the processing unit 60 determines that the employment condition is not met due to the retry condition being met, the processing unit 60 stores the axis-misalignment angle estimate as a provisional axis-misalignment angle estimate in the RAM and performs estimation of the axis-misalignment angle again, assuming that the axis is misaligned by the calculated axis-misalignment angle estimate.

This may allow the processing unit 60 to suppress the occurrence of a situation in which estimates of axis-misalignment angle with low estimation accuracy are used, thereby improving the estimation accuracy.

The axis-misalignment estimation method based on the second axis-misalignment estimation process is a method in which the axis-misalignment angle estimation accuracy may not deteriorate in response to factors that deteriorate the axis-misalignment angle estimation accuracy in the axis-misalignment estimation method based on the first axis-misalignment estimation process. Specifically, in the axis-misalignment estimation method based on the first axis-misalignment estimation process, if the detection accuracy of the position and relative speed of a stationary object detected by ego-motion of the own vehicle deteriorates, the axis-misalignment angle estimation accuracy may deteriorate. By contrast, the axis-misalignment estimation method based on the second axis-misalignment estimation process does not use ego-motion of the own vehicle. Therefore, in the axis-misalignment estimation method based on the second axis-misalignment estimation process, the axis-misalignment estimation accuracy may not deteriorate due to ego-motion of the own vehicle.

In a case where the estimation accuracy has deteriorated in the axis-misalignment estimation method based on the first axis-misalignment estimation process, this allows the processing unit 60 to determine that the estimation accuracy has deteriorated by comparing the estimate of the axis-misalignment angle resulting from the first axis-misalignment estimation process with the estimate of the axis-misalignment angle resulting from the second axis-misalignment estimation process, thereby preventing occurrence of a situation where the estimate of the axis-misalignment angle with low estimation accuracy is employed.

Figure 1B:
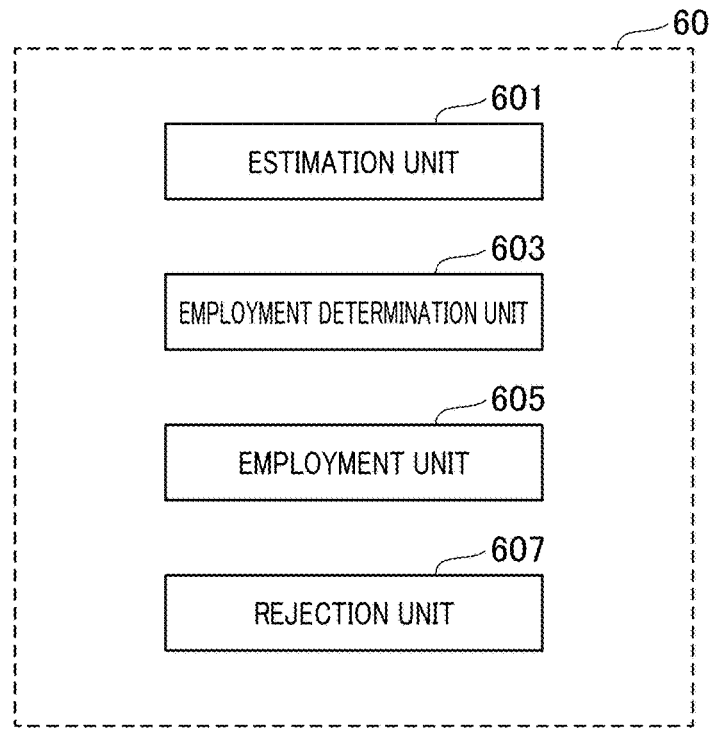
FIG. 1B is a functional block diagram of a processing unit of the radar device.

In the embodiment described above, the processing unit 60 corresponds to the axis-misalignment estimation device. As illustrated in FIG. 1B, the processing unit 60 includes, as functional blocks, an estimation unit 601, an employment determination unit 603, an employment unit 605, and a rejection unit 607. These functional blocks may be implemented by the CPU executing the program stored in the ROM. The process steps S220 and S230 are implemented by the estimation unit 601. The process steps S290 and S300 are implemented by the employment determination unit 603 and the rejection unit 607. The process step S310 is implemented by the employment unit 605.

As above, while the specific embodiments of the present disclosure have been described above, the present disclosure is not limited to the above-described embodiments, and may be implemented with various modifications.

First Modification

For example, in the embodiment described above, the two axis-misalignment angle estimation methods are used. Alternatively, three or more axis-misalignment angle estimation methods may be used.

Second Modification

In the embodiment described above, one of the two estimates of axis-misalignment angle is employed. Alternatively, for example, the average of the two estimates of axis-misalignment angle may be employed.

The processing unit 60 and its method described in the present disclosure may be implemented by a dedicated computer including a processor and a memory programmed to execute one or more functions embodied by computer programs. Alternatively, the processing unit 60 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium. The technique for implementing the functions of each part included in the processing unit 60 does not necessarily include software, and all of its functions may be implemented using A plurality of functions possessed by one constituent element in the foregoing embodiments may be implemented by a plurality of constituent elements, or one function possessed by one constituent element may be implemented by a plurality of constituent elements. In addition, a plurality of functions possessed by a plurality of constituent elements may be implemented by one constituent element, or one function implemented by a plurality of constituent elements may be implemented by one constituent element. Some of the components in the foregoing embodiments may be omitted. At least some of the components in the foregoing embodiments may be added to the other components in the foregoing embodiments or may replace with the other components in the foregoing embodiments.

Besides the radar device 1 described above, the present disclosure can be implemented in various modes such as a system including the radar device 1 as a constituent element, a program for causing a computer to serve as the radar device 1, a non-transitory tangible storage medium, such as a semiconductor memory, storing this program, an axis-misalignment estimation method, and others.

What is claimed is:

1. An axis-misalignment estimation device for estimating an axis-misalignment angle of a radar device mounted to a moving object, comprising:
an estimation unit configured to, based on detection results of the radar device, estimate the axis-misalignment angle using a plurality of different axis-misalignment angle estimation methods;
an employment determination unit configured to determine whether a predefined employment condition is met, based on a plurality of axis-misalignment angle estimates estimated by the estimation unit using respective ones of the plurality of axis-misalignment angle estimation methods; and
an employment unit configured to, in response to the employment determination unit determining that the employment condition is met, employ at least one of the plurality of axis-misalignment angle estimates.

2. The axis-misalignment estimation device according to claim 1, further comprising:
a rejection unit configured to, in response to the employment determination unit determining that the employment condition is not met, reject employment of the plurality of axis-misalignment angle estimates estimated by the estimation unit, and cause the estimation unit to retry or terminate estimation of the axis-misalignment angle.

3. The axis-misalignment estimation device according to claim 2, wherein
the plurality of axis-misalignment angle estimation methods include a first estimation method and a second estimation method that is different from the first estimation method, and
the second estimation method is a method such that an axis-misalignment angle estimation accuracy does not deteriorate in response to factors that deteriorate the axis-misalignment angle estimation accuracy in the first estimation method.

4. The axis-misalignment estimation device according to claim 3, wherein
the first estimation method is a method of estimating the axis-misalignment angle using at least one of a position and a relative speed of a stationary object detected by the radar device, and at least one of a position and a relative speed of the stationary object detected by ego-motion of the moving object, and
the second estimation method is a method of estimating the axis-misalignment angle using the position and the relative speed of the stationary object detected by the radar device.

5. The axis-misalignment estimation device according to claim 1, wherein
the plurality of axis-misalignment angle estimation methods include a first estimation method and a second estimation method that is different from the first estimation method, and
the second estimation method is a method such that an axis-misalignment angle estimation accuracy does not deteriorate in response to factors that deteriorate the axis-misalignment angle estimation accuracy in the first estimation method.

6. The axis-misalignment estimation device according to claim 5, wherein
the first estimation method is a method of estimating the axis-misalignment angle using at least one of a position and a relative speed of a stationary object detected by the radar device, and at least one of a position and a relative speed of the stationary object detected by ego-motion of the moving object, and
the second estimation method is a method of estimating the axis-misalignment angle using the position and the relative speed of the stationary object detected by the radar device.

* * * * *